(12) United States Patent
Karia et al.

(10) Patent No.: US 12,265,645 B2
(45) Date of Patent: Apr. 1, 2025

(54) SECURELY RESPONDING TO QUERIES INVOLVING MOBILE VIRTUAL NETWORK OPERATORS ON A MOBILE NETWORK

(71) Applicant: INTERNATIONAL BUSINESS MACHINES CORPORATION, Armonk, NY (US)

(72) Inventors: Jignesh K Karia, Thane (IN); Sudip Dutta, Kolkata (IN); Pankaj Satyanarayan Dayama, Bangalore (IN); Suman Das, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 17/661,922

(22) Filed: May 4, 2022

(65) Prior Publication Data

US 2023/0359760 A1 Nov. 9, 2023

(51) Int. Cl.
*G06F 21/62* (2013.01)
*H04L 9/00* (2022.01)
*H04L 9/32* (2006.01)
*H04W 12/02* (2009.01)

(52) U.S. Cl.
CPC ........ *G06F 21/6245* (2013.01); *H04L 9/3218* (2013.01); *H04L 9/50* (2022.05); *H04W 12/02* (2013.01)

(58) Field of Classification Search
CPC ..... G06F 21/6245; H04L 9/50; H04L 9/3218; H04W 12/02
See application file for complete search history.

(56) References Cited

U.S. PATENT DOCUMENTS

| | | |
|---|---|---|
| 7,822,188 B1 | 10/2010 | Kirchhoff |
| 8,175,622 B2 | 5/2012 | Jiang |
| 8,219,558 B1 | 7/2012 | Trandal et al. |
| 10,687,210 B2 | 6/2020 | Ram |
| 10,965,461 B1 * | 3/2021 | Wright .................. H04L 9/3239 |
| 2004/0162058 A1 | 8/2004 | Mottes |
| 2014/0089669 A1* | 3/2014 | Papillon ................ H04L 9/0844 713/171 |
| 2015/0085664 A1* | 3/2015 | Sachdev ............. H04L 41/0893 370/236 |
| 2015/0141022 A1 | 5/2015 | Duroux |

(Continued)

FOREIGN PATENT DOCUMENTS

WO WO-2020136512 A1 * 7/2020

OTHER PUBLICATIONS

"Why Secure MVNO is your next smart move" Airbus, Printed Mar. 22, 2022, 12 pages, <https://www.securelandcommunications.com/hubfs/pdf/Why-Secure-MVNO-is-your-next-smart-move-Airbus-white-paper.pdf>.

(Continued)

*Primary Examiner* — Luu T Pham
*Assistant Examiner* — Paul J Skwierawski
(74) *Attorney, Agent, or Firm* — Edward J. Wixted, III

(57) ABSTRACT

In an approach, a processor receives a query relating to mobile number porting on a mobile network that includes a hierarchy including a mobile network operator and a mobile virtual network operator, the query requiring access to customer private data. A processor identifies a minimal number of participants in the mobile network with access to the customer private data. A customer provides a response to the query.

9 Claims, 5 Drawing Sheets

(56) References Cited

U.S. PATENT DOCUMENTS

2018/0316800 A1\* 11/2018 Zimmerman ......... H04W 8/183
2020/0092688 A1\* 3/2020 Piscopo, Jr. ............ H04W 4/16
2021/0297456 A1 9/2021 Raleigh
2022/0038289 A1\* 2/2022 Huang .................... G06F 16/27
2024/0147219 A1\* 5/2024 Chaugule ............. H04W 12/06

OTHER PUBLICATIONS

Bhawn et al., "Recommendations on 'Introducing Virtual Network Operators in telecom sector", Telecom Regulatory Authority of India, May 1, 2015, 75 pages, <https://trai.gov.in/sites/default/files/Recommendations_VNO_01_05_2015.pdf>.

Monshizadeh et al., "Mobile Virtual Network Operators (MVNO) Security", A Comprehensive Guide to 5G Security, Chapter 14, Jan. 2018, pp. 321-345, <https://www.researchgate.netpublication/322467278_Mobile_Virtual_Network_Operators_MVNO_Security>.

\* cited by examiner

SECURELY RESPONDING TO QUERIES INVOLVING MOBILE VIRTUAL NETWORK OPERATORS ON A MOBILE NETWORK

BACKGROUND

The present invention relates to mobile networks, and more specifically, to approaches to resolve data privacy issues involving multiple mobile virtual network operators (MVNOs) participating in a hierarchical manner on a wireless network infrastructure.

An MVNO is a wireless communications service provider that does not own the wireless network infrastructure over which it provides services. MVNOs enter in business agreements with a mobile network operator (MNO) to obtain bulk access to network services at wholesale rates, then sets retail prices independently. MVNOs may use their own customer service, billing support systems, marketing, and sales personnel.

An MNO is a provider of wireless communications services that owns or controls all the elements necessary to sell and deliver services to an end user, including radio spectrum allocation, wireless network infrastructure, billing, customer care, provisioning computer systems, and marketing and repair organizations. In addition to offering retail services under its own brand, an MNO may also sell access to network services at wholesale rates to MVNOs.

A mobile virtual network enabler (MVNE) provides network infrastructure and related services, such as business support systems, administration, and operations support systems to an MVNO, enabling the MVNO to offer services to their own customers with their own brands. MVNEs do not have to have a relationship with consumers and might, instead, be a provider of network enablement platforms and services. A mobile virtual network aggregator (MVNA) is a related type of company to an MVNE. MVNAs are based on a business model which includes wholesale of an MNOs airtime and routing traffic over the MVNE's own switches.

A distributed ledger is a consensus of replicated, shared, and synchronized digital data geographically spread across multiple sites, countries, or institutions. In general, a distributed ledger database is spread across several nodes (i.e., devices) on a peer-to-peer network, where each replicates and saves a copy of the ledger and updates itself independently. When a ledger update happens, each node constructs a new transaction, and then the nodes vote by consensus algorithm which copy is correct. Once a consensus has been determined, all the other nodes update themselves with the new, correct copy of the ledger. Security is accomplished through cryptographic keys and signatures.

SUMMARY

According to some embodiments of the present invention, a computer-implemented method, computer program product, and computer system are provided. A processor receives a query relating to mobile number porting on a mobile network that includes a hierarchy including a mobile network operator and a mobile virtual network operator, the query requiring access to customer private data. A processor identifies a minimal number of participants in the mobile network with access to the customer private data. A customer provides a response to the query.

DETAILED DESCRIPTION

Embodiments of the present invention describe an approach to jointly respond to porting-related complaints involving joint participants while also ensuring data confidentiality by identifying a minimum number of participants from a hierarchical network structure involving mobile virtual network operators (MVNOs) and executing a secure multiparty computation protocol. Embodiments of the present invention further describe an approach where the confidentiality of customer data is provided by maintaining a private data collection between a subset of the participants (e.g., mobile network operators (MNOs), MVNOs at one or more tiers) involved in providing services to that customer. Embodiments of the present invention further disclose an approach to respond to queries related to ongoing porting processes in a verifiable manner while ensuring data confidentiality in such a hierarchical network structure. Embodiments of the present invention further disclose an approach to allow each participant from such a hierarchical network structure to securely access and retrieve data from a private data collection set. Embodiments of the present invention additionally describe an approach to allow for scenarios where MNVOs undergo acquisition and/or merger from such a hierarchical network structure.

The present invention will now be described in detail with reference to the Figures.

Figure 1:
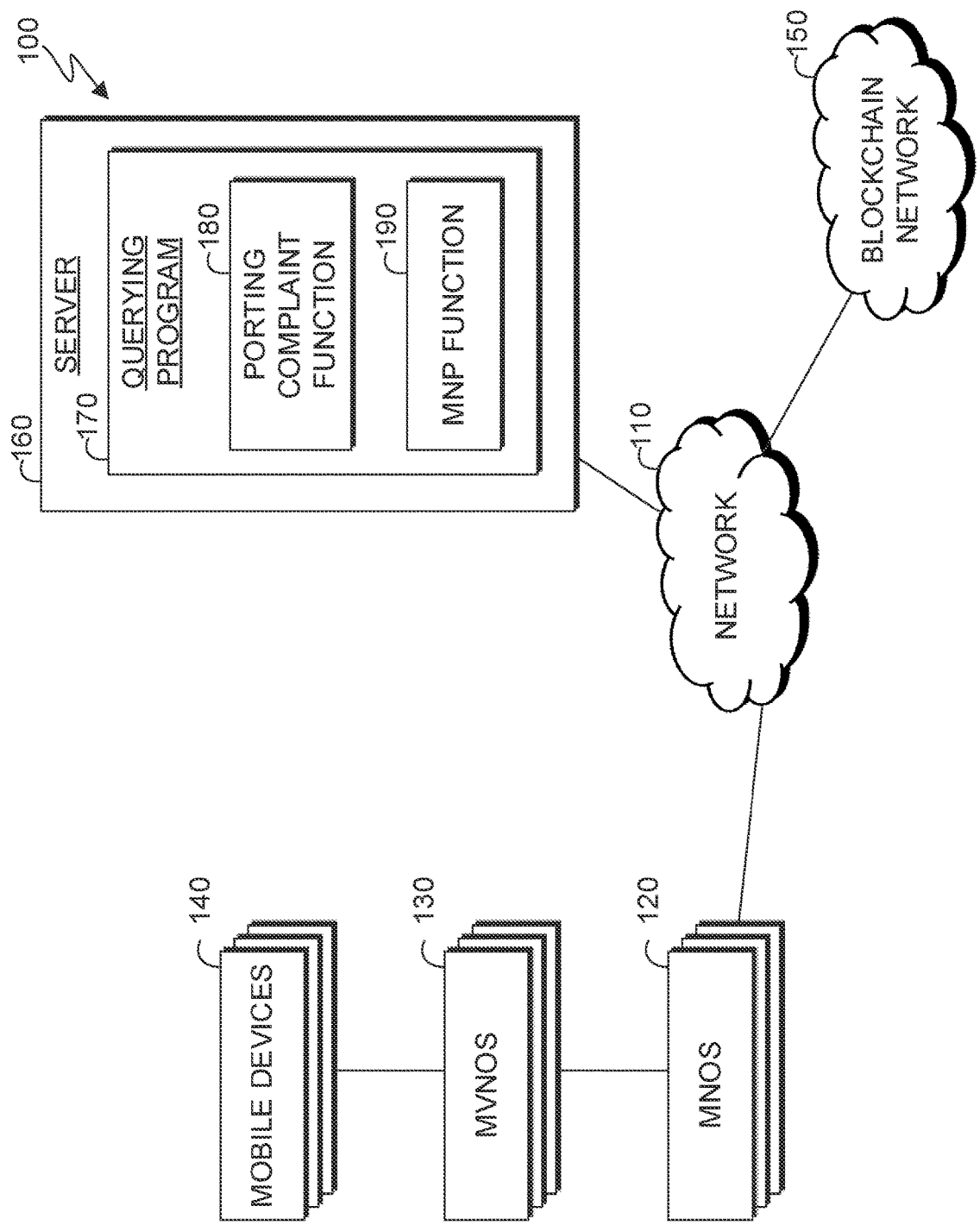
FIG. 1 depicts a diagram of a computing environment, in accordance with one embodiment of the present invention.

FIG. 1 depicts a diagram of computing environment 100, in accordance with one embodiment of the present invention. FIG. 1 provides only an illustration of one embodiment and does not imply any limitations with regard to the environments in which different embodiments can be implemented.

In the depicted embodiment, computing environment 100 includes MNOs 120, blockchain network 150, and server 160 interconnected over network 110. Network 110 can be a local area network (LAN), a wide area network (WAN) such as the Internet, the public switched telephone network (PSTN), any combination thereof, or any combination of connections and protocols that will support communications between MNOs 120, blockchain network 150, and/or server 160, in accordance with embodiments of the invention. Network 110 can include wired, wireless, or fiber optic connections. Computing environment 100 can include additional computing devices, servers, computers, mobile devices, or other devices not shown.

As used herein, a reference number may refer to either a single instance of the referenced object or multiple instances of the object. For example, MNO 120 may refer to a single MNO 120 or multiple MNOs 120, collectively.

Each MNO 120 is a different provider of wireless communication services that own or control all of the elements necessary to sell and deliver services to an end user, including radio spectrum allocation, wireless network infrastructure, billing, customer care, provisioning computer systems, and marketing and repair organizations. In addition to offering retail services under its own brand, each MNO 120 may also sell access to network services at wholesale rates to MVNOs, such as MNVOs 130.

Each MVNO 130 is a wireless communications service provider that does not own the wireless network infrastructure over which it provides services. MVNOs 130 may each enter into business agreements with MNOs 120 to obtain bulk access to network services at wholesale rates, then sets retail prices independently. Each MVNO 130 may use its own customer service, billing support systems, marketing, and sales personnel. MVNOs 130 may each also enter into business agreements with mobile virtual network enablers (MVNEs) and/or mobile virtual network aggregators (MVNAs). An MVNE provides network infrastructure and related services, such as business support systems, administration, and operations support systems to an MVNO 130, enabling the MVNO 130 to offer services to their own customers with their own brands. MVNEs do not have to have a relationship with consumers and might, instead, be a provider of network enablement platforms and services. An MVNA is a related type of company to an MVNE. MVNAs are based on a business model which includes wholesale of an MNO's 120 airtime and routing traffic over the MVNE's own switches.

Figure 4:
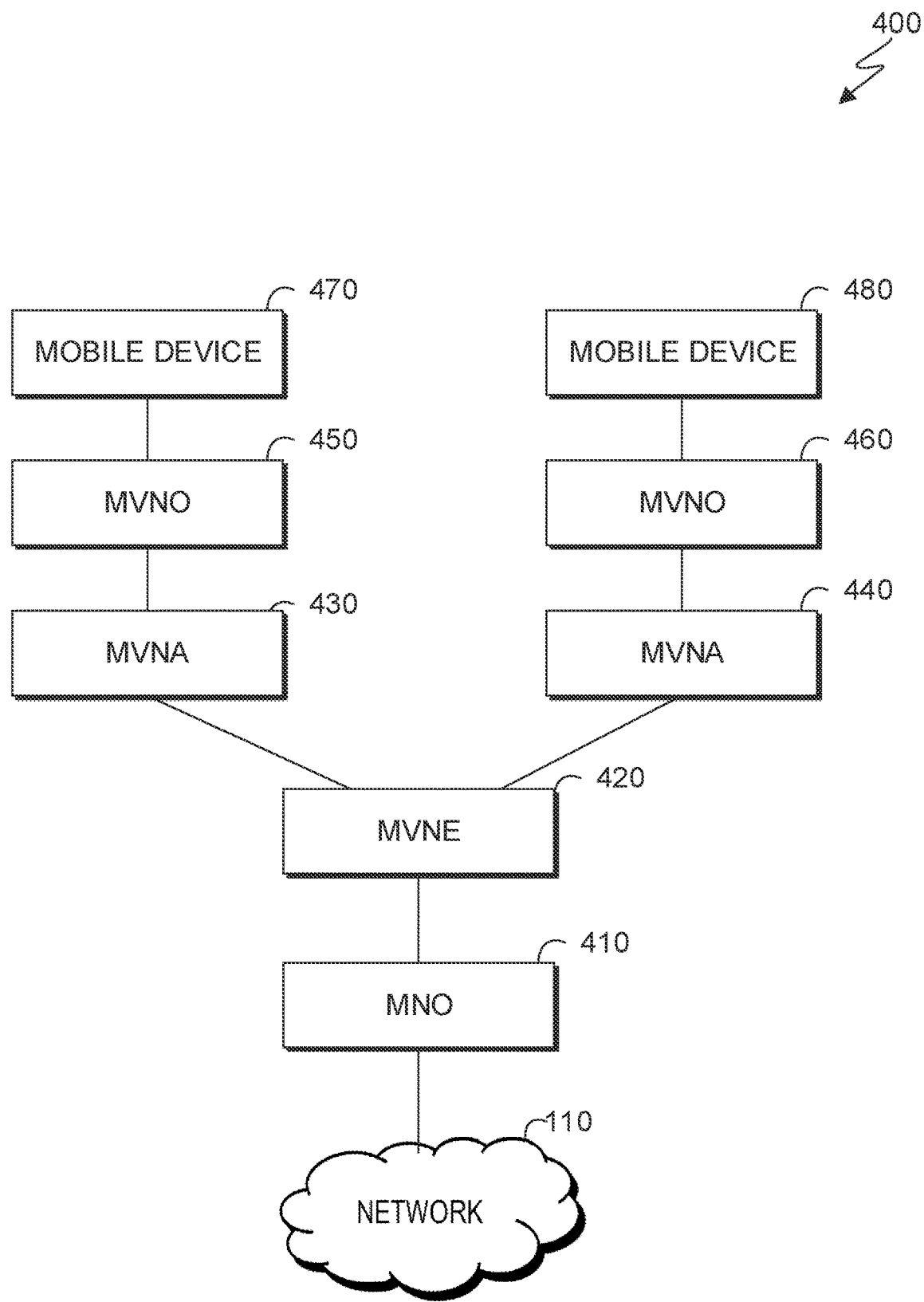
FIG. 4 depicts an example network hierarchy, in accordance with one embodiment of the present invention.

The MVNOs 130 may comprise one or more tiers, creating a hierarchical level of services. For example, in a three tier hierarchy, a tier one MVNO 130 may consume services provided by an MNO 120 and provide services to a tier two MVNO 130. Similarly, the tier two MVNO 130 may provide services to a tier three MVNO 130, while the tier three MVNO 130 provides services to and end user, such as mobile device 140. For simplicity sake, various tiers of MVNOs are not depicted in FIG. 1. However, an example is depicted in FIG. 4. Similarly, it should be noted that individual MVNOs 130 may instead comprise MVNEs or MVNOs.

While FIG. 1 depicts MNOs 120 and MVNOs 130, it should also be noted that MNOs 120 and MVNOs 130 each represent the network infrastructure and/or services that are provided by the respective MNOs 120 and MVNOs 130 to illustrate that, for example, mobile device 140 subscribes to a cellular service offered by MVNO 130 which operates on the cellular network infrastructure provided by MNO 120. Therefore, mobile device 140 is able to access network 110 through services and infrastructure provided by MVNO 130 and MNO 120. The relationships that might exist between different MNOs 120 and MVNOs 130 may be many, and might be more accurately represented as a mesh of MNOs 120 and MVNOs 130, of a variety of tiers (e.g., MVNOs, MVNAs, MVNEs) that have different business relationships with one another in terms of which MNO 120, or MNOs 120, are providing network infrastructure services to a particular MNVO 130. Meanwhile instances of MNVO 130 may provide services to other instances of MNVO 130, creating the mesh hierarchical structure described above.

In order to support Unsolicited Commercial Communication (UCC), mobile number portability (MNP), roaming settlement, and other network services, MVNOs 130 and MNOs 120 utilize a distributed ledger of blockchain network 150 to share information as required to process a query.

Mobile device 140 can be a laptop computer, netbook computer, tablet computer, personal digital assistant (PDA), smartphone, or cell phone. In general, mobile device 140 can be any electronic device or computing system capable of accessing network 110 via an MVNO 130 or an MNO 120 and communicating with server 160. As depicted in FIG. 1, mobile devices 140 are each connected to network 110 through MNVOs 130. However, it should be noted that, in some embodiments, a mobile device 140 may connect to network 110 via an MNO 120. Mobile device 140 can include components, as depicted and described in further detail with respect to FIG. 5.

Blockchain network 150 is a technical infrastructure that provides a ledger and smart contract (chaincode) services to an application. Smart contracts are used to generate transactions which are subsequently distributed to every peer node in the blockchain network where they are immutably recorded on their copy of the ledger. The users of such applications might be end users using client applications or blockchain network 150 administrators. Blockchain network 150 stores private data collections (PDCs), which comprise the actual private data itself, which is only sent peer-to-peer to organizations authorized to see it, and a hash of the data which is endorsed, ordered, and written to the ledgers of every peer on the channel. The hash serves as evidence of the transaction and is used for state validation and can be used for audit purposes. Customer private data sets associated with the users of mobile devices 140 are each stored on blockchain network 150 as PDCs in the underlying distributed ledger. The customer private data set may include, for example, billing details, profile data (e.g., name, address, do not disturb (DND) preferences), network status, network configuration information, and last port date. Visibility of such information is limited to participating MNVOs 130 and MNOs 120. Participating MNVOs 130 and MNOs 120 refer to the MNVOs 130 and/or MNOs 120 that are providing services and/or network infrastructure to a particular mobile device 140 associated with the respective customer private data set. An example is described with reference to FIG. 4.

PDCs may be used when a group of organizations (e.g., MNOs 120, MVNOs 130) on a channel need to keep data private from other organizations on that channel. PDCs allow a defined subset of organizations on a channel the ability to endorse, commit, or query private data without having to create a separate channel. PDCs allow for the sharing of private data with a third party and the third party can then compute the hash of the private data to see if it matches the state on the channel ledger, proving that the state existed between the collection members at a particular point in time.

Server 160 can be a management server, a web server, or any other electronic device or computing system capable of receiving and sending data. In some embodiments, server 160 can be a laptop computer, tablet computer, netbook computer, personal computer (PC), a desktop computer, or any programmable electronic device capable of communicating with mobile devices 140, MVNOs 130, MNOs 120, and/or blockchain network 150 via network 110. In other embodiments, server 160 can represent a server computing system utilizing multiple computers as a server system, such as in a cloud computing environment. In another embodiment, server 160 represents a computing system utilizing clustered computers and components to act as a single pool of seamless resources. In the depicted embodiment, server 160 contains, at least, querying program 170, porting complaint function 180, and MNP function 190.

Querying program 170 executes on server 160. Querying program 170 operates to receive and process queries to allow participants to query required data from a distributed ledger platform, hosted on nodes of blockchain network 150, the data comprising customer private data sets associated with individual mobile devices 140. Querying program 170 may receive queries from mobile devices 140, MVNOs 130, and/or MNOs 120. In some embodiments, querying program 170 utilizes an interface (e.g., one or more application programming interfaces) to respond to porting related complaints involving joint participants by identifying minimal number of participants from a hierarchical network structure involving MVNOs 130 and executing secure multi-party computation from PDC(s) stored to a distributed ledger of blockchain network 150. In other embodiments, querying program 170 may reside on other devices, provided that querying program 170 can communicate with mobile devices 140, MVNOs 130, MNOs 120, and/or blockchain network 150. Querying program 170 may include porting complaint function 180 and MNP function 190.

Porting complaint function 180 operates to receive, process, and respond to queries that are submitted on porting complaints. Porting is the process of taking an existing phone number and transferring it to another provider. Such queries may require porting complaint function 180 to identify one or more PDCs of blockchain network 150 that have the data for responding to the query based on the network of MVNOs, customers, and MNOs associated with the query. Porting complaint function 180 may identify the minimum number of participants (e.g., MNOs 120, MVNOs 130, MVNAs, MVNEs) that have access to all of the required PDC data in order to preserve privacy for the customer(s) involved. Porting complaint function 180 may be a function of querying program 170 or may be a stand-alone program. In one embodiment, porting complaint function 180 resides on server 160. In other embodiments, porting complaint function 180 may reside on another server or another computing device, provided that porting complaint function 180 is accessible to querying program 170 and has access to blockchain network 150, MNOs 120, MVNOs 130, and/or mobile device 140.

MNP function 190 operates to receive, process, and respond to queries that are submitted MNP. Such queries may require MNP function 190 to identify one or more PDCs of blockchain network 150 that have the data for responding to the query based on the network of MVNOs, customers, and MNOs associated with the query. MNP function 190 may identify a common participant (e.g., MNO 120, MVNO 130, MVNA, MVNE) that has access to all of the required PDC data such that the common participant can respond to the query and generate a zero-knowledge proof that the response is correct without revealing the data of the one or more PDCs. A zero-knowledge proof is a method by which one party (the prover) can prove to another party (the verifier) that a given statement is true while the prover avoids conveying any additional information apart from the fact that the statement is indeed true. MNP function 190 may be a function of querying program 170 or may be a stand-alone program. In one embodiment, MNP function 190 resides on server 160. In other embodiments, MNP function 190 may reside on another server or another computing device, provided that MNP function 190 is accessible to querying program 170 and has access to blockchain network 150, MNOs 120, MVNOs 130, and/or mobile device 140.

Figure 2:
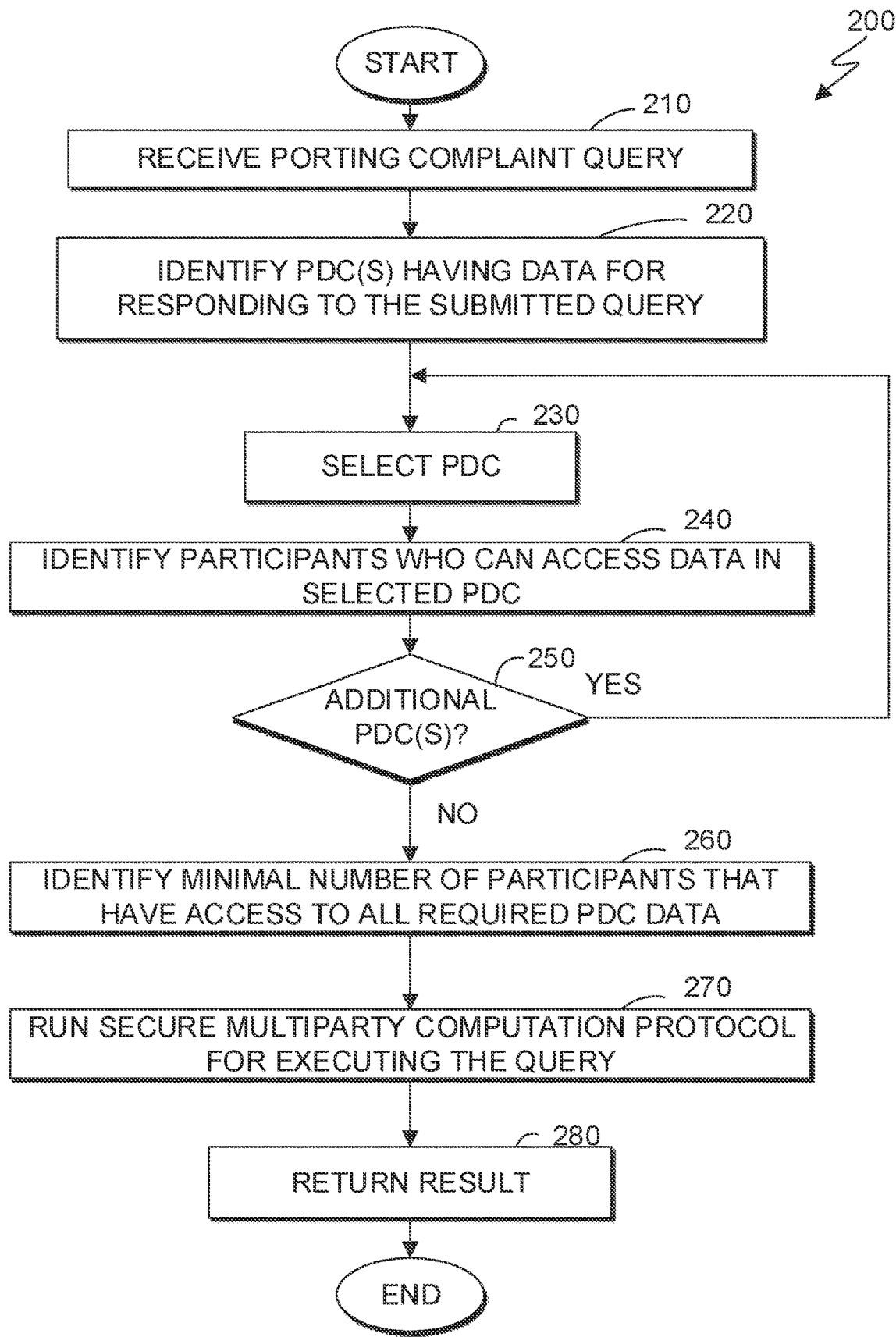
FIG. 2 depicts a flowchart of the steps of a porting complaint function of a querying program executing within the computing environment of FIG. 1, for responding to joint queries across multiple mobile virtual network operators (MVNOs) and/or mobile network operators (MNOs) with data confidentiality, in accordance with one embodiment of the present invention.

FIG. 2 depicts a flowchart 200 of the steps of porting complaint function 180 executing within computing environment 100 of FIG. 1, for responding to joint queries across multiple MVNOs 130 and/or MNOs 120 with data confidentiality, in accordance with one embodiment of the present invention.

In one embodiment, initially, customer private data sets associated with end user customers are stored to blockchain network 150 as PDCs in an underling distributed ledger. The customer private data sets may include data attributes for MNP, UCC, services, etc. The data attributes of the customer private data sets may include, but are not limited to billing details, profile data (e.g., name, address, DND preferences), network status, network configuration information, and last port date.

Such data is shared throughout the network hierarchy of MVNOs 130 and MNOs 120. However, visibility of customer private data sets is limited to participating MVNOs 130 and/or MNOs 120 (e.g., MVNOs 130 and/or MNOs 120 that provide services to the particular customer associated with the respective customer private data set).

In step 210, porting complaint function 180 receives a query on a porting complaint. The query may be, for example, a query to: (i) get details of complaints, with history, registered for the phone number of a particular customer; (ii) get a list of complaints raised against a particular MVNO 130 for a given date and time range; (iii) obtain a consolidated list of complaints with statuses across MVNOs 130 for a given date and time range; (iv) obtain a consolidated list of complaints with resolution across MVNOs 130 for a given date and time range; (v) obtain a consolidated list of complaints with each MNO 120, along with information on both resolution and status, for a given date and time range; or (vi) obtain a consolidated turn around time and/or end to end resolution time for all complaints for a given date and time range. Queries may be received from end users (via mobile devices 140), MVNOs 130, or MNOs 120, based on the type of query and data required based on business needs and processes.

In step 220, porting complaint function 180 identifies PDCs that have the data necessary for responding to the submitted query. Porting complaint function 180 identifies the PDCs that have the necessary customer private data required to respond to the received query based on the network of MNOs 120, MVNOs 130, and customers associated with mobile devices 140. Porting complaint function 180 may identify one or more PDCs. For example, porting complaint function 180 may identify that PDC_1, PDC_2, . . . PDC_n have the data necessary for responding to the submitted query.

In step 230, porting complaint function 180 selects a PDC from the identified PDCs. In general, porting complaint function 180 selects a PDC that porting complaint function 180 has not yet previously analyzed with respect to the submitted query. For example, initially, porting complaint function 180 may select PDC_1. In subsequent iterations, porting complaint function 180 may then select PDC_2 through PDC_n.

In step 240, porting complaint function 180 identifies the participants (e.g., MVNOs 130, MNOs 120) that can access the customer private data in the selected PDC. Generally, the participants that have access to the customer private data for the selected PDC correspond to those participants that are either directly providing services to the customer (e.g., an MVNO 130) or indirectly are providing services to the customer based on a hierarchical relationship between an MNO 120 and the MVNO 130 that the customer directly interacts with. For example, mobile device 140 may utilize services from a first MVNO 130, which uses services from a second MVNO 130 (e.g., an MVNA or MVNE), and the second MVNO 130 may utilize the network provided by the infrastructure of a first MNO 120. As previously described the specific relationships between end users, MVNOs 130, and MNOs 120 may vary and form a hierarchical web of different services. Porting complaint function 180 may identify one or more participants that have access to the data in the selected PDC. For example, porting complaint function 180 may identify that participants L_1, L_2, . . . L_n have access to the data in the selected PDC.

In decision 250, porting complaint function 180 determines whether there are additional identified PDCs that have not yet been analyzed. The PDCs that are to be analyzed are the PDCs that porting complaint function 180 identified previously in step 220. Porting complaint function 180 may maintain a list of the identified PDCs and determine whether each PDC on the list has been analyzed. If porting complaint function 180 determines that there are additional PDCs to be analyzed (decision 250, yes branch), porting complaint function 180 selects an additional PDC (see step 230). If porting complaint function 180 determines that there are not additional PDCs to be analyzed (decision 250, no branch), porting complaint function 180 identifies the minimal number of participants that have access to all of the required PDC data (see step 260).

In step 260, porting complaint function 180 identifies the minimal number of participants that have access to all of the required PDC data necessary to respond to the query. As each PDC may have a different subset of MVNOs 130 and/or MNOs 120 that are able to access the respective PDC, porting complaint function 180 is generally identifying a minimum number of participants that have access to the PDCs identified by porting complaint function 180 in step 220. For example, porting complaint function 180 may identify that participants P1, P2, . . . P_m are the minimum number of participants that have access to all of the required PDC data, which may be a subset of L_1-L_n or all of L_1-L_n, depending on the particular data required by the query and the participants that have access to each of the PDCs.

In step 270, porting complaint function 180 runs a secure multi-party computation protocol between the identified minimum number of participants (see step 260) for executing the query using the necessary private data obtained from the respective PDCs. Secure multi-party computation is a subfield of cryptography with the goal of creating methods for parties to jointly compute a function over their inputs while keeping those inputs private. Unlike traditional cryptographic tasks, where cryptography assures security and integrity of communication or storage and the adversary is outside the system of participants (e.g., an eavesdropper on the sender and/or receiver), the cryptography in a secure multi-party computation model protects participants' privacy from one another. Traditional cryptography is about concealing content, whereas secure multi-party computation and corresponding protocols are about concealing partial information about data while computing with the data from many sources and correctly producing outputs. Multi-party protocols may make use of secret sharing. In such secret sharing based approaches, the parties do not play special roles and, instead, the data associated with each wire is shared amongst the parties, and a protocol is then used to evaluate each gate. Secret sharing allows one to distribute a secret among a number of parties by distributing shares to each party. Two types of secret sharing schemes are Shamir secret sharing and additive secret sharing. In both types, the shares are random elements of a finite field that add up to the secret in the field and security is achieved because any non-qualifying set of shares appear to look randomly distributed. The output of the secure multi-party computation protocol is the query result. Because a secure multi-party computation protocol is used, nothing about the input of each party is leaked, but for whatever information might be able to be learned from the resulting output.

In step 280, porting complaint function 180 returns the result of the query to the customer or participant that submitted the query.

Figure 3:
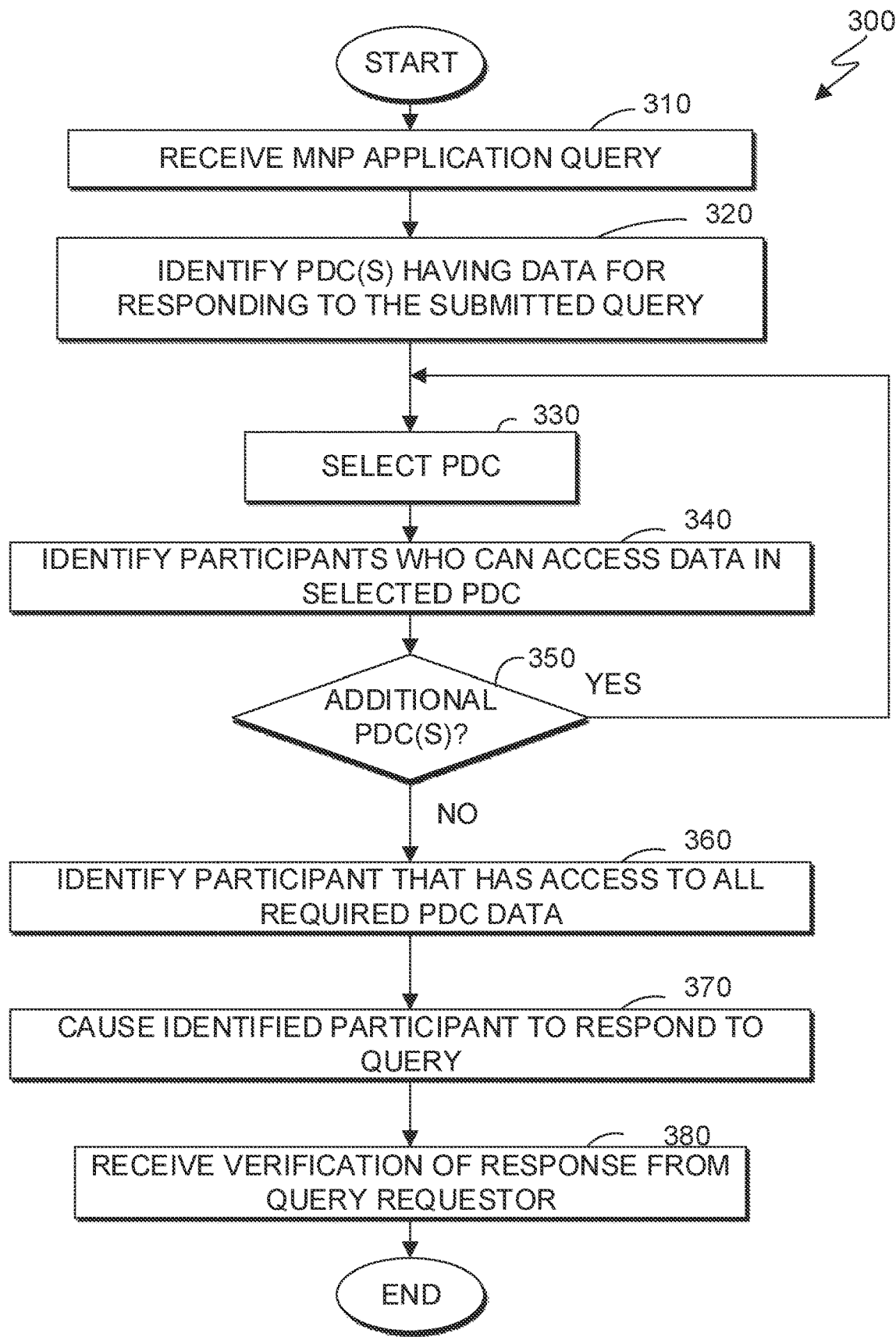
FIG. 3 depicts a flowchart of the steps of a mobile number porting (MNP) function of a querying program executing within the computing environment of FIG. 1, for responding to queries related to MNP and ongoing porting processes in a verifiable manner while ensuring data confidentiality in a hierarchical network structure involving MNVOs, in accordance with one embodiment of the present invention.

FIG. 3 depicts a flowchart 300 of the steps of MNP function 190 executing within computing environment 100 of FIG. 1, for responding to queries related to MNP and ongoing porting processes in a verifiable manner while ensuring data confidentiality in a hierarchical network structure involving MVNOs 130, such as the hierarchical network structure depicted in computing environment 100 of FIG. 1.

In one embodiment, initially, customer private data sets associated with end user customers are stored to blockchain network 150 as PDCs in an underlying distributed ledger. The customer private data sets may include data attributes for MNP, UCC, services, etc. The data attributes of the customer private data sets may include, but are not limited to billing details, profile data (e.g., name, address, DND preferences), network status, network configuration information, and last port date.

Such data is shared throughout the network hierarchy of MVNOs 130 and MNOs 120. However, visibility of customer private data sets is limited to participating MVNOs 130 and/or MNOs 120 (e.g., MVNOs 130 and/or MNOs 120 that provide services to the particular customer associated with the respective customer private data set).

In step 310, MNP function 190 receives a query related to MNP, ongoing porting processes, or otherwise relating to MNP applications. The query may be, for example, to: (i) query details about a customer's last port out date(s); (ii) query details about current network status (e.g., active, inactive, barred); (iii) prepare port out or port in requests/responses; (iv) query a customer's billing status for porting requests; (v) obtain details of customer port in or port out status; (vi) obtain details of complaints related to porting; or (vii) obtain details of a customer's unique porting code (UPC). Queries may be received from end users (via mobile devices 140), MVNOs 130, or MNOs 120, based on the type of query and data required based on business needs and processes.

In step 320, MNP function 190 identifies PDCs that have the data necessary for responding to the submitted query. MNP function 190 identifies the PDCs that have the necessary customer private data required to respond to the received query based on the network of MNOs 120, MVNOs 130, and customers associated with mobile devices 140. MNP function 190 may identify one or more PDCs. For example, MNP function 190 may identify that PDC_1, PDC_2, . . . PDC_n have the data necessary for responding to the submitted query.

In step 330, MNP function 190 selects a PDC from the identified PDCs. In general, MNP function 190 selects a PDC that MNP function 190 has not yet previously analyzed with respect to the submitted query. For example, initially, MNP function 190 may select PDC_1. In subsequent iterations, MNP function 190 may then select PDC_2 through PDC_n.

In step 340, MNP function 190 identifies the participants (e.g., MVNOs 130, MNOs 120) that can access the customer private data in the selected PDC. Generally, the participants that have access to the customer private data for the selected PDC correspond to those participants that are either directly providing services to the customer (e.g., an MVNO 130) or indirectly are providing services to the customer based on a hierarchical relationship between an MNO 120 and the MVNO 130 that the customer directly interacts with. For example, mobile device 140 may utilize services from a first MVNO 130, which uses services from a second MVNO 130 (e.g., an MVNA or MVNE), and the second MVNO 130 may utilize the network provided by the infrastructure of a first MNO 120. As previously described the specific relationships between end users, MVNOs 130, and MNOs 120 may vary and form a hierarchical web of different services. MNP function 190 may identify one or more participants that have access to the data in the selected PDC. For example, MNP function 190 may identify that participants L_1, L_2, . . . L_n have access to the data in the selected PDC.

In decision 350, MNP function 190 determines whether there are additional identified PDCs that have not yet been analyzed. The PDCs that are to be analyzed are the PDCs that MNP function 190 identified previously in step 320. MNP function 190 may maintain a list of the identified PDCs and determine whether each PDC on the list has been analyzed. If MNP function 190 determines that there are additional PDCs to be analyzed (decision 350, yes branch), MNP function 190 selects an additional PDC (see step 330). If MNP function 190 determines that there are not additional PDCs to be analyzed (decision 350, no branch), MNP function 190 identifies a common participant that has access to all of the required PDC data (see step 360).

In step 360, MNP function 190 identifies a common participant that has access to all of the required PDC data. As each PDC may have a different subset of MVNOs 130 and/or MNOs 120 that are able to access the respective PDC, porting complaint function 180 is generally a single participant that has access to all of the PDCs identified by MNP function 190 in step 320. For example, porting complaint function 180 may identify that participant P has access to all of the required PDC data, which is one of the participants of L_1-L_n and the common participant selected depends on the particular data required by the query and the participants that have access to each of the PDCs.

In step 370, MNP function 190 causes the identified participant to respond to the submitted query. For example, MNP function 190 may forward the query to the identified participant along with an instruction to respond to the query requestor. In some embodiments, MNP function 190 may require that the identified participant generates a zero-knowledge proof that the response to the query is correct, without revealing the data. In cryptography, a zero-knowledge proof is an approach by which one party (the prover) proves to another party (the verifier) that a given statement is true while the prover avoids conveying any additional information apart from the fact that the statement is indeed true.

In step 380, MNP function 190 receives verification of the response to the query from the query requestor. In some embodiments, MNP function 190 may merely receive verification that the query requestor received a response to the query. In other embodiments, MNP function 190 may receive a verification that, as a result of the zero-knowledge proof generated by the participant responding to the query, the response to the query has been verified as correct.

FIG. 4 depicts example network hierarchy 400. The depicted network hierarchy 400 is a very simple example that shows an MNO 410 providing network infrastructure and/or services to MVNE 420. MVNE 420 provides services to both MVNA 430 and MVNA 440. MVNA 430 provides services to MVNO 450, which supports a customer associated with mobile device 470. MVNA 440 provides services to MVNO 460, which supports a customer associated with mobile device 470.

As has been previously discussed, customer data is stored to blockchain network 150 as PDCs in an underlying distributed ledger. As depicted, customer private data for the customer associated with mobile device 470 shall be visible only to MNO 410, MVNE 420, MVNA 430, and MVNO 450. Further, customer private data for the customer associated with mobile device 480 shall be visible only to MNO 410, MVNE 420, MVNA 440, and MVNO 460. Accordingly, a first set of one or more PDCs may be used to securely store the customer private data for the customer associated with mobile device 470 and a second set of one or more PDCs may be used to securely store the customer private data for the customer associated with mobile device 480, and the visibility of the information is as described above.

Figure 5:
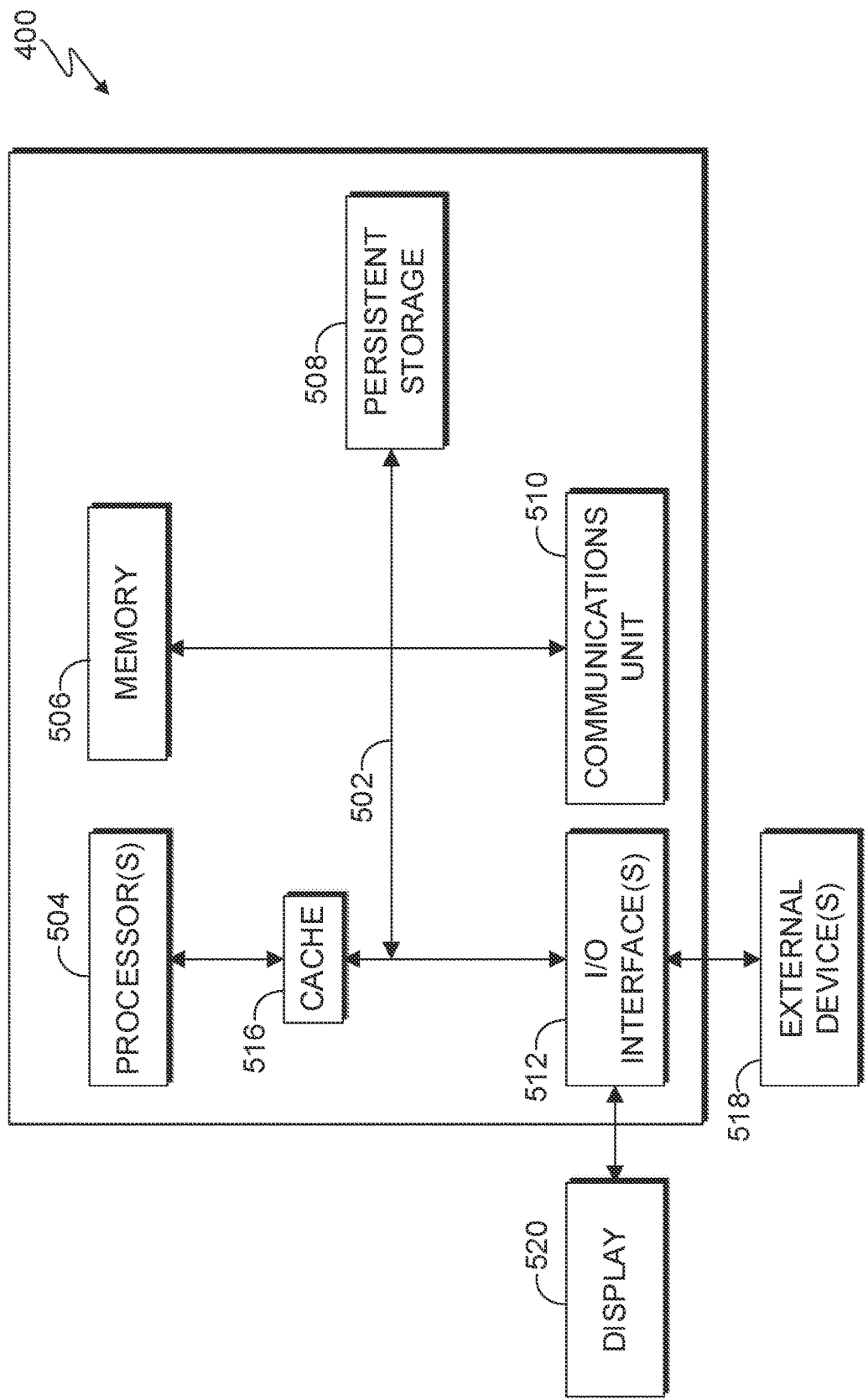
FIG. 5 depicts a block diagram of components of the mobile devices and/or server of FIG. 1, in accordance with one embodiment of the present invention.

FIG. 5 depicts a block diagram of components of mobile devices 140 and/or server 160 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Mobile devices 140 and server 160 each include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 458 are computer readable storage media. In this embodiment, memory 506 includes random access memory (RAM). In general, memory 406 can include any suitable volatile or non-volatile computer readable storage media. Cache 516 is a fast memory that enhances the performance of computer processor(s) 404 by holding recently accessed data, and data near accessed data, from memory 406.

Querying program 170, porting complaint function 180, and MNP function 190 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Querying program 170, porting complaint function 180, and MNP function 190 may be downloaded to persistent storage 508 through communications unit 510.

I/O interface(s) 512 allows for input and output of data with other devices that may be connected to mobile devices 140 and/or server 160. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., querying program 170, porting complaint function 180, and MNP function 190, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   maintaining, by one or more processors, customer private data in a plurality of private data collections in a distributed ledger of a blockchain network, wherein:
   each respective private data collection is shared throughout a mobile network but only accessible by a respective subset of network provider participants, including a mobile network operator and a mobile virtual network operator; and
   each network provider participant is involved in providing services to a customer associated with the customer private data;
   receiving a query relating to mobile number porting on the mobile network that includes a network provider hierarchy comprising the network provider participants, the network provider participants including the mobile network operator and the mobile virtual network operator, the query requiring access to a first private data collection and a second private data collection of the plurality of private data collections, wherein the query is further related to a mobile number porting application;
   identifying a smallest number of network provider participants in the mobile network that in aggregate have access to the first private data collection and the second private data collection, wherein;
   the smallest number of network provider participants is a plurality of the network provider participants; and
   identifying the smallest number of network provider participants in the mobile network that in aggregate have access to the first private data collection and the second private data collection comprises:
   identifying a set of private data collections, comprising the first and second private data collections, having the customer private data; and
   for each private data collection of the set of private data collections, identifying at least one network provider participant with access to the private data collection;
   causing the smallest number of network provider participants, that in aggregate have access to the first private data collection and the second private data collection on the distributed ledger of the blockchain network, to generate a result of the query;
   sending a response to the query that includes the result of the query; and
   receiving verification of the response to the query from a requestor of the query.

2. The computer-implemented method of claim 1, wherein:
   the query is further related to a porting complaint; and
   causing the smallest number of network provider participants to generate the result of the query comprises generating the result of the query by running a secure multiparty computation protocol between the identified smallest number of network provider participants using data from the set of private data collections.

3. The computer-implemented method of claim 1, further comprising causing generation of a zero-knowledge proof that the response to the query is correct.

4. A computer program product comprising:
   one or more computer readable storage media, and program instructions collectively stored on the one or more computer readable storage media, the program instructions comprising:
   program instructions to maintain customer private data in a plurality of private data collections in a distributed ledger of a blockchain network, wherein:
   each respective private data collection is shared throughout a mobile network but only accessible by a respective subset of network provider participants, including a mobile network operator and a mobile virtual network operator; and
   each network provider participant is involved in providing services to a customer associated with the customer private data;
   program instructions to receive a query relating to mobile number porting on the mobile network that includes a network provider hierarchy comprising the network provider participants, the network provider participants including the mobile network operator and the mobile virtual network operator, the query requiring access to a first private data collection and a second private data collection of the plurality of private data collections, wherein the query is further related to a mobile number porting application;

program instructions to identify a smallest number of network provider participants in the mobile network that in aggregate have access to the first private data collection and the second private data collection, wherein:
the smallest number of network provider participants is a plurality of the network provider participants; and
program instructions to identify the smallest number of network provider participants in the mobile network that in aggregate have access to the first private data collection and the second private data collection comprise:
program instructions to identify a set of private data collections, comprising the first and second private data collections, having the customer private data; and
program instructions to, for each private data collection of the set of private data collections, identify at least one network provider participant with access to the private data collection;
program instructions to cause the smallest number of network provider participants, that in aggregate have access to the first private data collection and the second private data collection on the distributed ledger of the blockchain network, to generate a result of the query;
program instructions to send a response to the query that includes the result of the query; and
program instructions to receive verification of the response to the query from a requester of the query.

5. The computer program product of claim 4, wherein:
the query is further related to a porting complaint; and
program instructions to cause the smallest number of network provider participants to generate the result of the query comprise program instructions to generate the result of the query by running a secure multiparty computation protocol between the identified smallest number of network provider participants using data from the set of one or more private data collections.

6. The computer program product of claim 4, further comprising program instructions, collectively stored on the one or more computer readable storage media, to cause generation of a zero-knowledge proof that the response to the query is correct.

7. A computer system comprising:
one or more computer processors, one or more computer readable storage media, and program instructions collectively stored on the one or more computer readable storage media for execution by at least one of the one or more computer processors, the program instructions comprising:
program instructions to maintain customer private data in a plurality of private data collections in a distributed ledger of a blockchain network, wherein:
each respective private data collection is shared throughout a mobile network but only accessible by a respective subset of network provider participants, including a mobile network operator and a mobile virtual network operator; and
each network provider participant is involved in providing services to a customer associated with the customer private data;
program instructions to receive a query relating to mobile number porting on the mobile network that includes a network provider hierarchy comprising the network provider participants, the network provider participants including the mobile network operator and the mobile virtual network operator, the query requiring access to a first private data collection and a second private data collection of the plurality of private data collections, wherein the query is further related to a mobile number porting application;
program instructions to identify a smallest number of network provider participants in the mobile network that in aggregate have access to the first private data collection and the second private data collection, wherein:
the smallest number of network provider participants is a plurality of the network provider participants; and
program instructions to identify the smallest number of network provider participants in the mobile network that in aggregate have access to the first private data collection and the second private data collection comprise:
program instructions to identify a set of private data collections, comprising the first and second private data collections, having the customer private data; and
program instructions to, for each private data collection of the set of private data collections, identify at least one network provider participant with access to the private data collection;
program instructions to cause the smallest number of network provider participants, that in aggregate have access to the first private data collection and the second private data collection on the distributed ledger of the blockchain network, to generate a result of the query;
program instructions to send a response to the query that includes the result of the query; and
program instructions to receive verification of the response to the query from a requester of the query.

8. The computer system of claim 7, wherein:
the query is further related to a porting complaint; and
program instructions to cause the smallest number of network provider participants to generate the result of the query comprise program instructions to generate the result of the query by running a secure multiparty computation protocol between the identified smallest number of network provider participants using data from the set of one or more private data collections.

9. The computer system of claim 7, further comprising program instructions, collectively stored on the one or more computer readable storage media for execution by at least one of the one or more computer processors, to cause generation of a zero-knowledge proof that the response to the query is correct.

* * * * *